(12) United States Patent
Wheeler et al.

(10) Patent No.: US 11,306,570 B2
(45) Date of Patent: Apr. 19, 2022

(54) FISHBONES, ELECTRIC HEATERS AND PROPPANT TO PRODUCE OIL

(71) Applicant: ConocoPhillips Company, Houston, TX (US)

(72) Inventors: T. J. Wheeler, Houston, TX (US); Siluni L Gamage, Houston, TX (US); Wendell P. Menard, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 309 days.

(21) Appl. No.: 16/008,162

(22) Filed: Jun. 14, 2018

(65) Prior Publication Data
US 2019/0017360 A1    Jan. 17, 2019

Related U.S. Application Data

(60) Provisional application No. 62/523,614, filed on Jun. 22, 2017.

(51) Int. Cl.
| | |
|---|---|
| *E21B 43/24* | (2006.01) |
| *E21B 43/30* | (2006.01) |
| *E21B 43/14* | (2006.01) |
| *C09K 8/592* | (2006.01) |
| *C09K 8/66* | (2006.01) |

(Continued)

(52) U.S. Cl.
CPC ......... *E21B 43/2401* (2013.01); *C09K 8/592* (2013.01); *C09K 8/665* (2013.01); *C09K 8/80* (2013.01); *E21B 43/14* (2013.01); *E21B 43/305* (2013.01); *C04B 35/64* (2013.01); *C04B 2235/3218* (2013.01); *C04B 2235/9607* (2013.01); *C09K 2208/00* (2013.01)

(58) Field of Classification Search
None
See application file for complete search history.

(56) References Cited

U.S. PATENT DOCUMENTS

| | | |
|---|---|---|
| 6,353,706 B1 | 3/2002 | Bridges |
| 7,069,993 B2 | 7/2006 | Hill |

(Continued)

FOREIGN PATENT DOCUMENTS

| | | |
|---|---|---|
| CA | 2684049 | 7/2014 |

OTHER PUBLICATIONS

Stalder J.L., et al., Alternative Well Configurations in SAGD: Rearranging Wells to Improve Performance, presented at 2012 World Heavy Oil Congress [WHOC12].

(Continued)

*Primary Examiner* — Charles R Nold
(74) *Attorney, Agent, or Firm* — Boulware & Valoir

(57) ABSTRACT

The present disclosure relates to a particularly effective well configuration that can be used for heat based oil recovery methods. Fishbone multilateral wells are combined with inline electric heaters and a thermally conductive proppant. Preferably, an array of overlapping fishbone wells cover the pay, allowing more complete production of the pay, and the use of the proppants prevents the open-hole fishbone laterals from collapsing. These methods can be applied in variety of configurations, including traditional vertically spaced well-pairs, laterally spaced well-pairs, producers only, and combinations thereof.

16 Claims, 13 Drawing Sheets

(51) Int. Cl.
*C09K 8/80* (2006.01)
*C04B 35/64* (2006.01)

(56) References Cited

U.S. PATENT DOCUMENTS

| | | |
|---|---|---|
| 8,265,468 B2 | 9/2012 | Carr, Sr. |
| 8,333,245 B2 | 12/2012 | Zupanick et al. |
| 8,376,052 B2 | 2/2013 | Zupanick et al. |
| 2011/0067858 A1 | 3/2011 | Dreher et al. |
| 2012/0227966 A1 | 9/2012 | Dreher, Jr. et al. |
| 2012/0247760 A1 | 10/2012 | Wheeler et al. |
| 2013/0199789 A1* | 8/2013 | Liang .............. E21B 43/26 166/305.1 |
| 2014/0096954 A1* | 4/2014 | Hocking .............. E21B 33/13 166/248 |
| 2014/0345855 A1 | 11/2014 | Wilfing et al. |
| 2014/0345861 A1 | 11/2014 | Stalder et al. |
| 2017/0081950 A1* | 3/2017 | Filatyev .............. E21B 43/2406 |

OTHER PUBLICATIONS

Lougheide, et al.,Trinidad's First Multilateral Well Successfully Integrates Horizontal Openhole Gravel Packs, OTC 16244 OTC (2004).
Stalder, et al., "Multilateral-Horizontal Wells Increase Rate and Lower Cost Per Barrel in the Zuata Field, Faja, Venezuela", SPE 69700-MS, Mar. 12, 2001.
Technical Advancements of Multilaterals (TAML). 2008. Available at http://taml-intl.org/taml-background/.
Multilateral Completions. Available at http://petrowiki.org/Multilateral_completions.
Husain, et al., Economic Comparison of Multi-Lateral Drilling over Horizontal Drilling for Marcellus Shale Field, EME 580 (2011), available online at http://www.ems.psu.edu/~elsworth/courses/egee580/2011/Final%20Reports/fishbone_report.pdf.
Hogg, C. Comparison of Multilateral Completion Scenarios and Their Application. Presented at the Offshore Europe, Aberdeen, United Kingdom, Sep. 9-12, 1997. SPE-38493-MS.

* cited by examiner

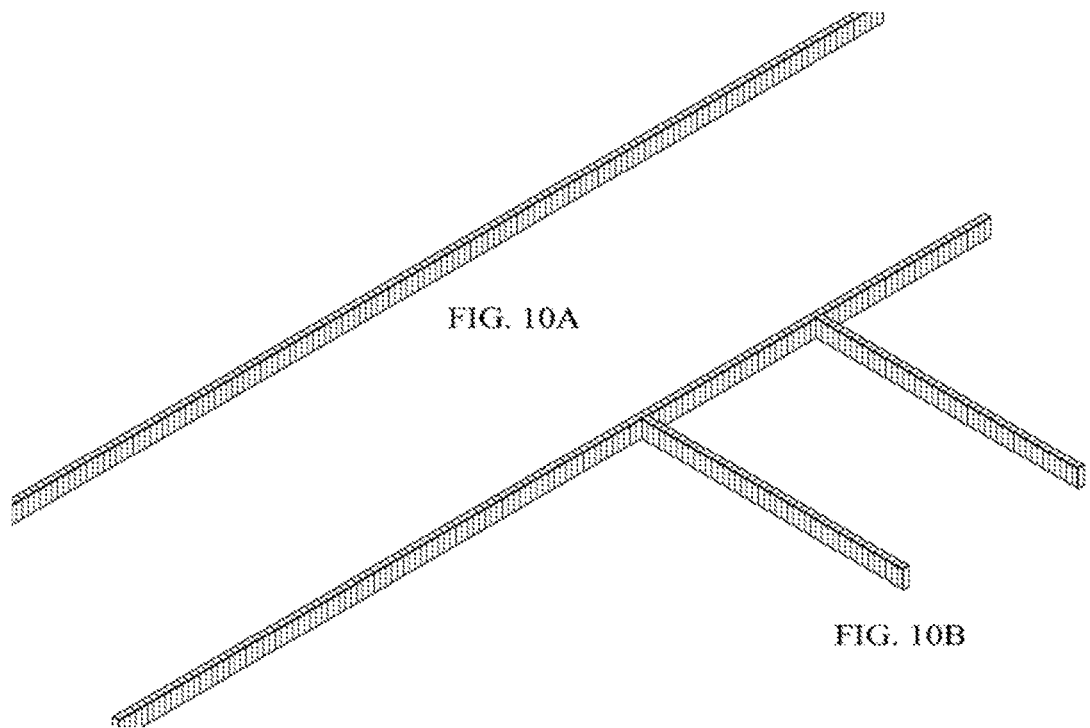
FIG. 10A
FIG. 10B
FIG. 11
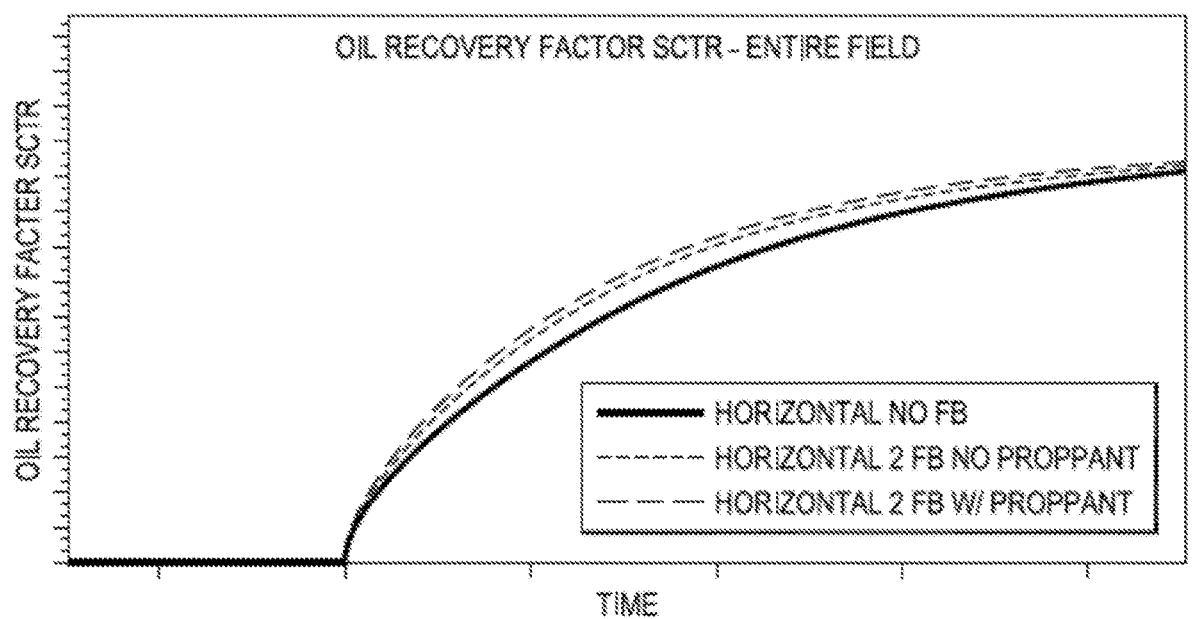

FISHBONES, ELECTRIC HEATERS AND PROPPANT TO PRODUCE OIL

PRIORITY CLAIM

This application claims priority to U.S. Ser. No. 62/523,614, filed Jun. 22, 2017, and incorporated by reference in its entirety for all purposes.

FIELD OF THE INVENTION

This invention relates generally to well configurations that can advantageously produce oil. In particular, electric heaters are deployed in the main or motherbore of a horizontal well and open-hole fishbones drilled off of the motherbore are filled with thermally conductive proppants. The heaters heat the region around the motherbore and the proppants, which are highly conductive, transmit heat to the reservoir to enhance the production of heavy oil. In Arctic environments, the use of downhole heaters avoids high heat levels at the surface, thus avoiding melting of the permafrost, and potential catastrophic results.

BACKGROUND OF THE INVENTION

Many countries in the world have large heavy oil deposits, including the United States, Russia, and the Middle East, but the world's largest deposits occur in Canada and Venezuela. Bitumen is a thick, sticky form of crude oil, so heavy and viscous (thick) that it will not flow unless heated or diluted with lighter hydrocarbons. At room temperature, bitumen is much like cold molasses. Often times, the viscosity can be in excess of 1,000,000 cP.

One common way to heat bitumen is by injecting steam into the reservoir—most commonly by cyclic steam stimulation (CSS) or Steam Assisted Gravity Drainage (SAGD). In CSS steam is injected into a well to drive heated oil towards a second well. Typically, the wells are vertical, but they do not have to be.

SAGD, however, is the most extensively used technique for in situ recovery of bitumen resources in the McMurray Formation in the Alberta Oil Sands. In a typical SAGD process, shown in FIG. 1, two horizontal wells are vertically spaced by 4 to 10 meters (m). The production well is located near the bottom of the pay and the steam injection well is located directly above and parallel to the production well. In SAGD, steam is injected continuously into the injection well, where it rises in the reservoir and forms a steam chamber.

With continuous steam injection, the steam chamber will continue to grow upward and laterally into the surrounding formation. At the interface between the steam chamber and cold oil, steam condenses and heat is transferred to the surrounding oil. This heated oil becomes mobile and drains, together with the condensed water from the steam, into the production well due to gravity segregation within steam chamber.

This use of gravity gives SAGD an advantage over CSS methods. SAGD employs gravity as the driving force and the heated oil remains warm and movable when flowing toward the production well. In contrast, conventional steam injection displaces oil to a cold area, where its viscosity increases and the oil mobility is again reduced.

Conventional SAGD tends to develop a cylindrical steam chamber with a somewhat tear-drop or inverted triangular cross section. With several SAGD well-pairs operating side by side, the steam chambers tend to coalesce near the top of the pay, leaving the lower "wedge" shaped regions midway between the steam chambers to be drained more slowly, if at all. Operators may install additional producing wells in these midway regions to accelerate recovery, as shown in FIG. 2, and such wells are called "infill" wells, filling in the area where oil would normally be stranded between SAGD well-pairs.

Although quite successful, SAGD does require enormous amounts of water in order to generate a barrel of oil. Some estimates provide that 1 barrel of oil from the Athabasca oil sands requires on average 2 to 3 barrels of water, although with recycling the total amount can be reduced to 0.5 barrel. In addition to using a precious resource, additional costs are added to convert those barrels of water to high quality steam for downhole injection. Therefore, any technology that can reduce water or steam consumption has the potential to have significant positive environmental and cost impacts.

Another problem with steam-based methods is that they may be less appropriate for use in the Artic, where injecting large amounts of steam for months and years on end has high potential to melt the permafrost, allowing pad equipment and wells to sink, with potentially catastrophic consequences. Indeed, the media is already reporting the slow sinking of Artic cities, and cracking and collapsing homes are a growing problem in cities such as Norilsk in northern Russia.

One concept for improving production is the "multilateral" or "fishbone" well configuration idea. The concept of fishbone wells for non-thermal horizontal wells was developed by Petrozuata in Venezuela starting in 1999. That operation was a cold, viscous oil development in the Faja del Orinoco Heavy Oil Belt. The basic concept was to drill open-hole side lateral wells or "ribs" off the main spine of a producing well prior to running slotted liner into the spine of the well (FIG. 3). Such ribs appeared to significantly contribute to the productivity of the wells when compared to wells without the ribs in similar geology (FIG. 4). A variety of multilateral well configurations are possible, see FIG. 5, although many have not yet been tested.

The advantages of multilateral wells can include:

1) Higher Production. In the cases where thin pools are targeted, vertical wells provide minimal contact with the reservoir, which causes lower production. Drilling several laterals in thin reservoirs and increasing contact improves recovery. Slanted laterals can be of particular benefit in thin, stacked pay zones.

2) Decreased Water/Gas Coning. By increasing the length of "wellbore" in a horizontal strata, the inflow flux around the wellbore can be reduced. This allows a higher withdrawal rate with less pressure gradient around the producer. Coning is aggravated by pressure gradients that exceed the gravity forces that stabilize fluid contacts (oil/water or gas/water), so that coning is minimized with the use of multilaterals, which minimize the pressure gradient.

3) Improved sweep efficiency. By using multilateral wells, the sweep efficiency may be improved, and/or the recovery may be increased due to the additional area covered by the laterals.

4) Faster Recovery. Production from the multilateral wells is at a higher rate than that in single vertical or horizontal wells, because the reservoir contact is higher in multilateral wells.

5) Decreased environmental impact. The volume of consumed drilling fluids and the generated cuttings during drilling multilateral wells are less than the consumed drilling fluid and generated cuttings from separated wells, at least to the extent that two conventional horizontal wells are replaced by one dual lateral well and to the extent that laterals share the same mother-bore. Therefore, the impact of the multilateral wells on the environment can be reduced.

6) Saving time and cost. Drilling several laterals in a single well may result in time and cost saving in comparison with drilling several separate wells in the reservoir.

US20140345861 describes the application of fishbone wells to modified SAGD, wherein the well-pairs are laterally spaced, rather than being vertically stacked. US20140345855 relates to a particularly effective well configuration, wherein a central wellpad originates injector and/or producer wells, arranged in a radial pattern, and either or both provided with multilateral wells, thus effectively expanding the coverage. US20150198022 combines fishbone multilateral wells with steam drive, effectively allowing drive processes to be used where previously the reservoir lacked sufficient injectivity to allow steam drive or cyclic steam based methods.

Although an improvement, the multilateral well methods have disadvantages too. One disadvantage is that fishbone wells are more complex to drill and clean up. Indeed, some estimate that multilaterals cost about 20% more to drill and complete than conventional slotted liner wells. Another disadvantage is increased risk of accident or damage, due to the complexity of the operations and tools. Sand control can also be difficult. In drilling multilateral wells, the mother well bore can be cased to control sand production, however, the legs branched from the mother well bore are open-hole. Therefore, the sand control from the branches is not easy to perform. There is also increased difficulty in modeling and prediction due to the sophisticated architecture of multilateral wells.

Another area of uncertainty with the fishbone concept is stability—whether the ribs will establish and maintain communication with the offset steam chambers, or will the open-hole ribs collapse early and block flow. One of the characteristics of the Athabasca Oil Sands is that they are unconsolidated sands that are bound by the million-plus centipoises bitumen. When heated to 50-80° C. the bitumen becomes slightly mobile. At this point the open-hole rib could easily collapse. If so, flow would slow to a trickle, temperature would drop, and the rib would be plugged. However, if the conduit remains open at least long enough that the bitumen in the near vicinity is swept away with the warm steam condensate before the sand grains collapse, then it may be possible that a very high permeability, high water saturation channel might remain even with the collapse of the rib. In this case, the desired conduit would still remain effective.

Yet another uncertainty with many ribs along a fishbone producer of this type is that one rib may tend to develop preferentially at the expense of all the other ribs leading to very poor conformance and poor results. This would imply that some form of inflow control may be warranted to encourage more uniform development of all the ribs.

Therefore, although beneficial, the multilateral well concept could be further developed to address some of these disadvantages or uncertainties. In particular, a method that combines multilateral well architecture with electrical heating would be beneficial, especially if such methods conserved the water, energy, and/or cost to produce a barrel of oil, and especially for Artic tundra environments, where steam based methods may be hazardous.

SUMMARY OF THE DISCLOSURE

Current SAGD practice involves arranging horizontal production wells low in the reservoir pay interval and horizontal steam injection wells approximately 4-10 meters above and parallel to the producing wells. Well-pairs may be spaced between 50 and 150 meters laterally from one another in parallel sets to extend drainage across reservoir areas developed from a single surface drilling pad.

Typically such wells are "preheated" by circulating steam from the surface down a toe tubing string that ends near the toe of the horizontal liner; steam condensate returns through the tubing-liner annulus to a heel tubing string that ends near the liner hanger and flows back to the surface through this heel tubing string. After such a period of "startup" circulation in both the producer and the injector wells for a period of about 3-6 months, the two wells will eventually reach fluid communication. The reservoir midway between the injector and producer wells will reach a temperature high enough (50-100° C.) so that the bitumen becomes mobile and can drain by gravity downward, while live steam vapor ascends by the same gravity forces to establish a steam chamber. At this time, the well-pair is placed into SAGD operation with injection in the upper well and production from the lower well, and production can begin.

US20140345861 took the concept of SAGD and combined it with a fishbone well architecture to improve steam recovery of oil, especially heavy oils. In general, fishbone wells replace conventional wellbores in SAGD operations. Either or both injector and producer wells are multilateral, and the arrangement of lateral wells—called "ribs"—is such as to provide overlapping coverage of the pay zone between the injector and producer wells. The injection wells may or may not be placed directly vertically above the producing well, but a preferred embodiment placed the injectors and producers are spaced laterally apart by about 50 to 150 meters, using the lateral wells to bridge the steam gaps. Where both well types have laterals, a pair of ribs can cover or nearly cover the distance between two wells, but where only one of the well types is outfitted with laterals, the lateral length can be doubled such that the single rib covers most of the distance between adjacent wells. It is also possible for laterals to intersect with each other or with one of the main wellbores. The open-hole ribs may be horizontal, slanted, or curved in the vertical dimension to optimize performance. Where pay is thin, horizontal laterals may suffice, but if the pay is thick and/or there are many stacked thin pay zones, it may be beneficial to combine horizontal and slanted laterals, thus contacting more of the pay zone. The use of this well configuration allowed the producer to significantly reduce or even eliminate the startup time needed to bring the well-pairs into fluid communication, saving 3-6 months of "startup" time.

We have now taken the next step in the development of the fishbone wells and combined fishbone wells, electric heaters and thermally conductive proppants. The proposed method requires drilling fishbones or multilateral wellbores from the producer or from both the injector (herein called an upper well) and the lower producer or from just the upper well. The open-hole fishbones are then filled with a material of high thermal conductivity.

The producer wells or the upper wells or both wells are configured with downhole electrical heaters in the wellbores. The heaters heat the near wellbore area, and also heat the proppant, allowing the heat to slowly propagate down the fishbones and thus heating the reservoir and heavy oil contained therein. By drilling fishbones or multilaterals, the surface area of the reservoir exposed to the heat as well as the oil drainage area are increased. This improves oil recovery and production rates in comparison to using downhole electrical heating alone from one or two horizontal wells.

Additionally, since the laterals are filled with proppant, the risk of hole collapse is greatly reduced. As with SAGD, once the well-pairs are in thermal communication, production can begin, however, as with the prior multilateral well designs, the startup period is expected to be greatly reduced, and if the coverage between upper and producer wells is sufficiently good, it could even be eliminated.

Further, since the heating zone of a electric heater can be controlled by changing the conductivity/resistance and insulation of the wire, the method avoids high heat levels at the surface that are provided by steam based methods. This method can thus be used in areas where SAGD and other steam injection processes are less viable due to high risk and cost associated with operating at high temperature and pressure conditions. In particular, Artic tundra wells are less amendable to steam injection methods because the injection of steam from the surface tends to melt the permafrost, which can then allow pad equipment and tubing to become destabilized and even sink.

Strictly speaking, since the method allows the heating of heavy oil without steam, the upper well should not be called an injector well. Thus, we have instead referred to the "upper" well and the producer well. However, the method is still gravity based, and once the two wells are in fluid communication, production can begin from the lower producer. Furthermore, the method may in some instances be combined with steam injection, e.g., at later time periods, and so it will be understood that the upper well can sometimes be called an injector well.

There is no impact on the completion, other than adding open-hole fishbones filled with conductive proppant. Only the motherbores are cased, and the completion is the same as any other horizontal well, being configured for injection if steam is to be used, and being configured for production otherwise.

In addition, the wells need not be arranged in traditional well-pairs, but other arrangements are contemplated. One example is producer wells with upwardly curving laterals and no upper wells. The laterals will still allow gravity drainage to the lower producer. Also contemplated are well-pairs that are more laterally separated, such as described in US20140345861. Here, the upper wells are laterally spaced from the producer wells by tens of meters, instead of being directly overhead (also known as "vertically stacked"), and the multilaterals can be horizontal or can curve up or down to a nearest neighbor. In yet another arrangement, the laterals snake or undulate up and down through the depth of a narrow play, thus collecting oil from throughout the play.

As used herein, "thermally conductive" refers materials that have low thermal resistance, e.g., >10 watts per meter kelvin ($Wm^{-1}K^{-1}$), preferably 20-30, or even >30 $Wm^{-1}K-1$ for certain high quality bauxites, and values in the hundreds for pure metals, such as copper.

| Thermal Conductivity | |
| --- | --- |
| Material | $C_t$ (W/cm-K) |
| Andalucite | 0.11 |
| Barite | 0.017 |
| Calcite | 0.038 (IIa), 0.044 (IIc) |
| Cordierite | 0.022 |
| Diamond | 5.4, 20 (synthetic) |
| Dolomite | 0.029 |

| Thermal Conductivity | |
| --- | --- |
| Material | $C_t$ (W/cm-K) |
| Epoxy | 0.002 |
| Fluorite | 0.01 |
| Forsterite | 0.059 |
| Graphite | 1.7 |
| Gypsum | 0.013 |
| Hematite | 0.13 |
| Kyanite | 0.17 |
| Magnetite | 0.05 |
| Mica | 0.042 (IIa, b), 0.007 (IIc) |
| Obsidian | 0.014 |
| Orthoclase | 0.042 |
| Periclase | 0.69 |
| Quartz | 0.065 (IIa), 0.12 (IIc) |
| Rutile | 0.088 (IIa), 0.13 (IIc) |
| Sapphire | 0.34 |
| Silvite | 0.07 |
| Spinel | 0.14 |
| Zicron | 0.042 |

| Thermal Conductivity | | |
| --- | --- | --- |
| Material | Thermal conductivity (cal/sec)/(cm$^2$ C/cm) | Thermal conductivity (W/m K)* |
| Diamond | ... | 1000 |
| Silver | 1.01 | 406.0 |
| Copper | 0.99 | 385.0 |
| Gold | ... | 314 |
| Brass | ... | 109.0 |
| Aluminum | 0.50 | 205.0 |
| Iron | 0.163 | 79.5 |
| Steel | ... | 50.2 |
| Lead | 0.083 | 34.7 |

Typically thermal conductivity is measured in geology for consolidated rock samples using the divided bar. There are various modifications to these devices depending on the temperatures and pressures needed as well as sample sizes. A sample of unknown conductivity is placed between two samples of known conductivity (usually brass plates). The setup is usually vertical with the hot brass plate at the top, the sample in between then the cold brass plate at the bottom. Heat is supplied at the top and made to move downwards to stop any convection within the sample. Measurements are taken after the sample has reached to the steady state (with zero heat gradient or constant heat over entire sample), this usually takes about 30 minutes and over.

The transient techniques can also be used, wherein one perform a measurement during the process of heating up, usually carried out by needle probes. Non-steady-state methods to measure the thermal conductivity do not require the signal to obtain a constant value. Instead, the signal is studied as a function of time. The advantage of these methods is that they can in general be performed more quickly, since there is no need to wait for a steady-state situation. The disadvantage is that the mathematical analysis of the data is in general more difficult.

As used herein, "proppants" means a solid particle of sufficient size as to still allow fluid flow through the proppant. Typical proppants include sand, treated sand or man-made ceramic materials, and are used to keep an induced hydraulic fracture open, during or following a fracturing treatment. The purpose of the proppant differs in the instant invention, however, and the proppant should have low thermal resistance, such that it effectively conducts heat to the reservoir and heavy oils contained therein.

The ideal thermally conductive proppant will be inert to the oil at reservoir and heater temperatures, have good mechanical strength, high roundness, small thermal expansion coefficient, and be inexpensive. Preferred materials allow flow of produced fluids, are medium to high strength, about 45-150 um mean diameter (D50), narrow size distribution, roundness and sphericity >0.6. The quality control of the proppants is described mainly in ISO 13503-2.

Thermally conductive proppant materials include sintered bauxite. In addition to sintered bauxite proppants, ceramic proppants and other proppants with high content of aluminum could also be used. Bauxite is a mixture of hydrous aluminum oxides, aluminum hydroxides, clay minerals, and insoluble materials such as quartz, hematite, magnetite, siderite, and goethite. The aluminum minerals in bauxite can include: gibbsite $Al(OH)_3$, boehmite AlO(OH), and, diaspore, AlO(OH). Because of the aluminum content, bauxite is a good thermal conductor, and because there are significant reserves, the cost is modest (50-100$/ton depending on quality).

Other thermally conductive material that could be used in this process include materials that contain beryllium, copper, carbon nanotubes, graphite, iron, nickel, carbon steel, tungsten, zinc and any other high thermally conductive metals.

The electrical downhole heater can be any known in the art or to be developed. For example, the patent literature provides some examples: U.S. Pat. Nos. 7,069,993, 6,353,706 and 8,265,468. There are also commercially available downhole electric heaters. ANDMIR™, for example, sells a downhole heater called ADDHEAT,™ which may be suitable for use herein.

One particularly useful example is the PETROTRACE™ by PENTAIR™. The typical system including a downhole electric heating cable, ESP electrical cable, power connection and end termination kits, clamping systems, temperature sensors, wellhead connectors and topside control and monitoring equipment. The cable has an operating temperature up to 122° F. (50° C.), provides up to 41 W/m, and is housed in a flexible armored polymer jacket, allowing for ease of installation on the outside of the production tube. Further, the cables are available in different sizes and power levels and in lengths of up to 3,937 ft (1,200 m). Advantageously, the heater can be configured so that more power and heat is delivered to the toe of a well. Heaters can also be deployed inside the other casing, outside production tubing, in coiled tubing, and the like. The heater could be strapped to the outer casing, however, this may limit future ability to repair it. Preferably the heating cable lies outside the production tubing and/or in contact with the slotted liner.

The invention can comprise any one or more of the following embodiments, in any combination:

A well configuration for electrically heated production of hydrocarbons, the well configuration comprising:
a plurality of horizontal producer wells, each producer well separated from an adjacent producer well by a distance D and configured for heating with an electric downhole heater;
each producer well at a first depth at or near the bottom of a hydrocarbon play;
a plurality of open hole lateral wells originating from said plurality of producer wells and covering at least 95% of said distance D;
wherein said plurality of lateral wells are filled with a thermally conductive proppant, such that said electric downhole heater heats said thermally conductive proppant, which then conveys heat to hydrocarbons, which can then be (and is) produced at said producer well.

A well configuration for electrically heated production of hydrocarbons, the well configuration comprising:
a plurality of horizontal producer wells, each producer well separated from an adjacent producer well by a distance D and configured for heating with an electric downhole heater;
each producer well at a first depth at or near the bottom of a hydrocarbon play;
a plurality of upper wells, each upper well being higher in said play than a producer well by 4-10 m, each upper well configured for heating with an electric downhole heater;
a plurality of lateral wells originating from said plurality of producer wells or said plurality of upper wells, or both producer wells and upper wells, and covering at least 95% of said distance D;
wherein said plurality of lateral wells are filled with a thermally conductive proppant material, such that said electric downhole heater heats said thermally conductive proppant which then conveys heat to hydrocarbons which can then be produced at said producer well.

A well configuration for electrically heated production of hydrocarbons, the well configuration comprising:
a plurality of horizontal producer wells, each producer well separated from an adjacent producer well by a distance D and configured for heating with an electric downhole heater;
each producer well at a first depth at or near the bottom of a hydrocarbon play;
a plurality of upper wells, each upper well being higher in said play than a producer well by 4-10 m, each upper well configured for heating with an electric downhole heater;
a plurality of lateral wells originating from said plurality of producer wells or said plurality of upper wells, or both producer wells and upper wells, and covering at least 95% (or 98, 99% or 100%) of said distance D;
wherein said plurality of lateral wells are filled with a thermally conductive proppant material, such that said electric downhole heater heats said thermally conductive proppant having a thermal conductivity of at least 20 watts per meter kelvin ($Wm^{-1}K^{-1}$).

Any well configuration herein described, wherein each of said a plurality of horizontal producer wells are arranged in a plurality of well-pairs, wherein each producer well has an horizontal upper well about 4-10 meters vertically stacked above said producer well, said upper well configured for heating with an electric downhole heater.

Any well configuration herein described, wherein each of said plurality of horizontal producer wells are arranged in a plurality of well-pairs, wherein each producer well has an horizontal upper well about 4-10 meters above and laterally spaced from said producer well, said upper well configured for heating with an electric downhole heater. The lateral spacing is at least 25 m, 50 m, 75 m or 100 m or more.

Any well configuration herein described, wherein said plurality of lateral wells originate from each of producer wells and each of said upper wells.

Any well configuration herein described, wherein said plurality of lateral wells originate from each of said plurality of horizontal producer wells, and intersect with an adjacent upper well or a lateral extending from an adjacent upper well.

Any well configuration herein described, wherein said plurality of lateral wells originate from each of said plurality of horizontal producer wells and slant upwards towards an adjacent upper well.

Any well configuration herein described, wherein said plurality of lateral wells are arranged in an alternating pattern.

Any well configuration herein described, wherein said plurality of lateral wells originate from each of said producer wells and each of said upper wells and are arranged in an alternating pattern such that ends of lateral wells from adjacent wells overlap, such that together a pair of lateral wells cover about 100% of said distance D.

Any well configuration herein described, wherein said distance D is at least 50 meters.

Any well configuration herein described, wherein said thermally conductive proppant has a thermal conductivity of at least 20 watts per meter kelvin ($Wm^{-1}K^{-1}$).

Any well configuration herein described, wherein said thermally conductive proppant is a bauxite.

A method of producing heavy oil, comprising:

providing a plurality of well-pairs separated by a distance D, each well-pair comprising a horizontal production well at or near a bottom of a play, and a horizontal upper well 4-5 meters above said production well, each well in a well-pair configured for heating with an electric downhole heater;

a plurality of open-hole lateral wells extending from said upper well or said production well or both, said plurality of lateral wells extending towards a nearest well-pair and covering at least 95% of D;

each of said lateral wells filled with a thermally conductive proppant;

applying electricity to said heater, thereby heating said proppant and mobilizing oil; and producing said mobilized oil at said production well in each well-pair.

Any method herein described, wherein said upper well is both laterally and vertically spaced from a production well in a given well-pair.

A method of production of hydrocarbons, said method comprising providing a well configuration as recited herein;

applying electricity to heat said heater(s);

heating said proppant and thereby producing mobilized hydrocarbons; and producing said mobilized hydrocarbons from said producer wells.

"Vertical" drilling is the traditional type of drilling in oil and gas drilling industry, and includes well <45° of vertical.

"Horizontal" drilling is the same as vertical drilling until the "kickoff point" which is located just above the target oil or gas reservoir (pay zone), from that point deviating the drilling direction from the vertical to horizontal. By "horizontal" what is included is an angle within 45° (<45°) of horizontal. All horizontal wells will have a vertical portion, but the majority of the well is within 45° of horizontal.

A "lateral" well as used herein refers to a well that branches off an originating well. An originating well may have several such lateral wells (together referred to as multilateral wells), and the lateral wells themselves may also have lateral wells.

"Multilateral" wells are wells having multiple branches or laterals tied back to a "mother" wellbore (also called the "originating" well), which conveys fluids to or from the surface. The branch or lateral is typically horizontal, but can curve up or down.

An "alternate pattern" or "alternating pattern" as used herein means that subsequent lateral wells alternate in direction from the originating well, first projecting to one side, then to the other.

A "pinnate" pattern has lateral on both sides of a motherbore.

As used herein a "slanted" well with respect to lateral wells, means that the well is not in the same plane as the originating well or kickoff point, but travels upwards or downwards from same.

As used herein, "overlapping" multilateral wells, means the ends of lateral wells from adjacent wellbores nearly reach or even pass each other or the next adjacent main wellbore, when viewed from the top. Such lateral wells may also "intersect" if direct fluid communication is achieved by direct intersection of two lateral wells, but intersection is not necessarily implied in the terms "overlapping" wells. Where intersecting wells are specifically intended, the specification and claims will so specify.

Overlapping lateral wells is one option, but it may be more cost effective to provide e.g., only producers with lateral wells. In such cases, the laterals can be made longer so as to reach or nearly reach or even intersect with an adjacent well. In this way, fewer laterals are needed, but the reservoir between adjacent main wellbores is still adequately covered to enable efficient communication and drainage.

By "nearly reach" we mean at least 95% of the distance between adjacent main wellbores is covered by a lateral or a pair of laterals.

By "main wellbores" what is meant are injector/upper and producer wells. They can also be called "motherbores," if multilaterals originate off them.

The phrase "directly above" or "vertically stacked" refers to typical well-pair configuration for SAGD, but does not imply a high degree of geometric precision or perfection, as wells meander a small amount due to drilling errors and changes in reservoir rock characteristics. Thus, the term allows the normal degree of variation that is typically observed in in SAGD well-pairs.

By "laterally spaced" we mean to the side, when viewed from a top view. An upper well can be both vertically and laterally spaced from its cognate producer, or can be vertically stacked, roughly directly over the producer.

By "open-hole" what is meant is that the well is not cased.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| | |
|---|---|
| SAGD | Steam assisted gravity Drainage |

BRIEF DESCRIPTION OF DRAWINGS

FIG. 10A-B shows the simulation model parameters. Simulations were performed with GGS STARS.

FIG. 11 shows the simulation results for oil recovery factors versus time with the ordinary horizontal well (solid line), a horizontal well with two open-hole fishbones (dotted line) and a horizontal well with two open-hole fishbones filled with proppant (dashed line). SCTR is sector recovery.

DETAILED DESCRIPTION OF THE DISCLOSURE

Figure 1:
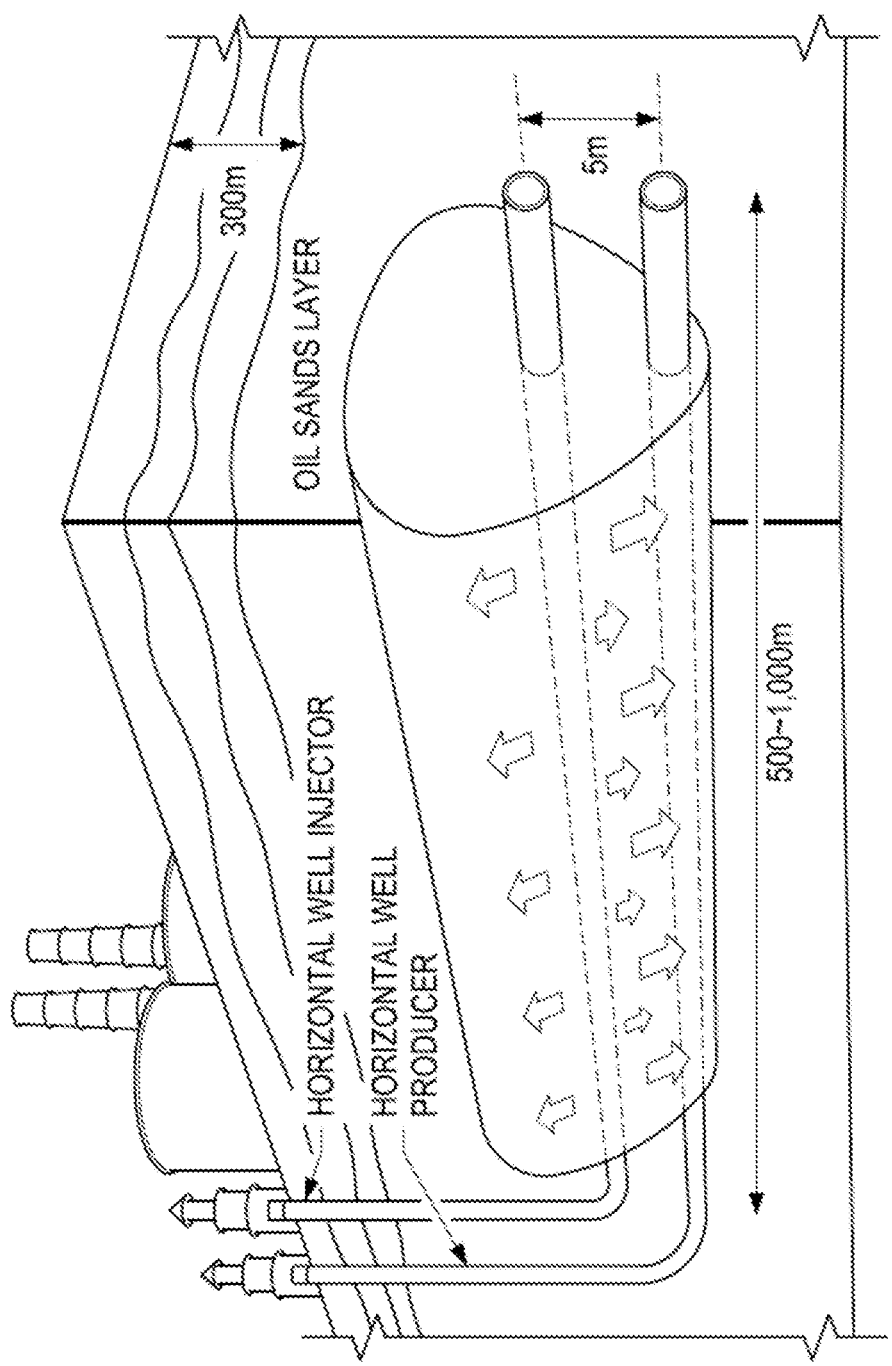
FIG. 1 shows a conventional SAGD well-pair.
Figure 2:
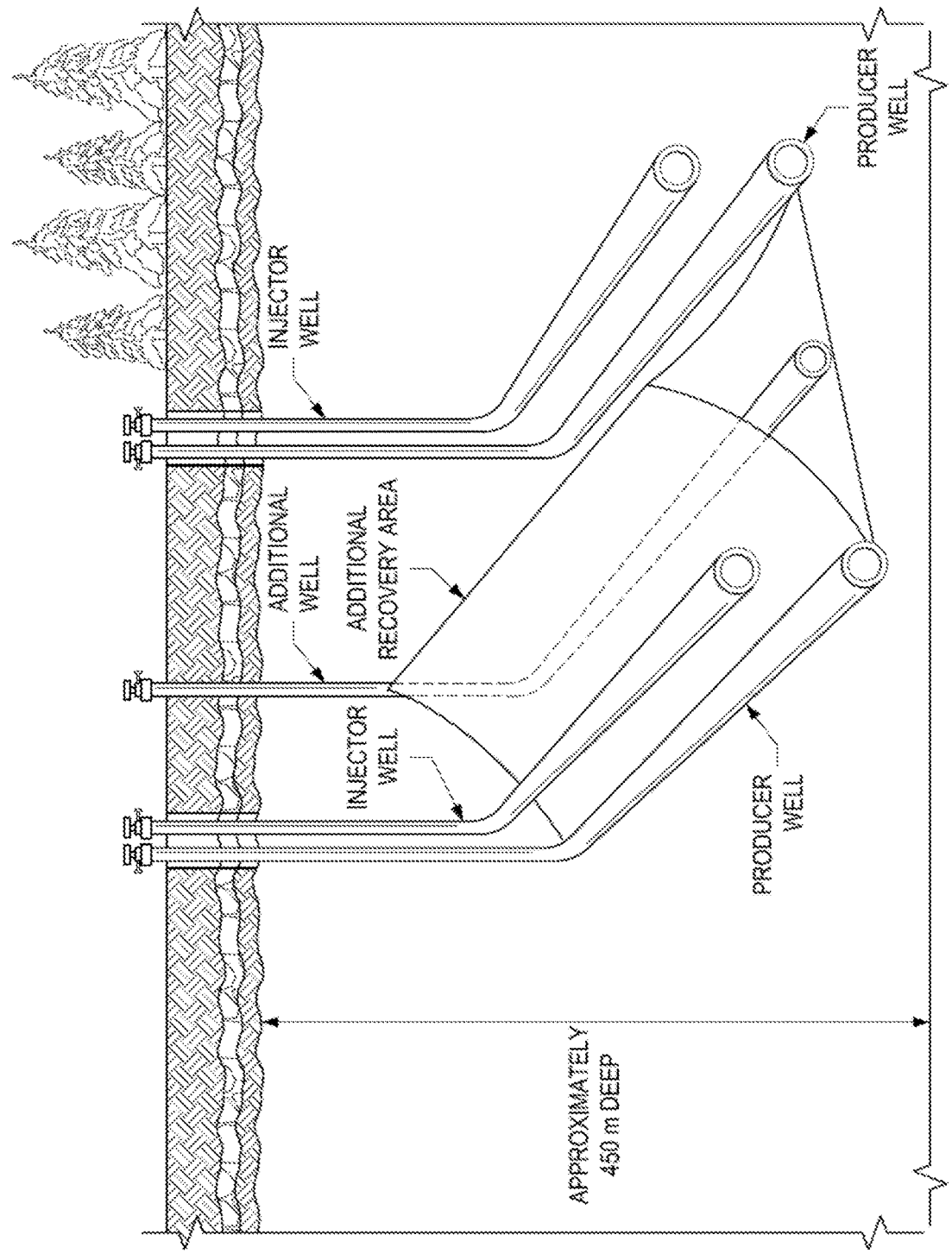
FIG. 2 shows the addition of an additional production well between a pair of SAGD well-pairs to try to capture the "wedge" of oil between pairs of well-pairs that is typically left unrecovered.
Figure 3:
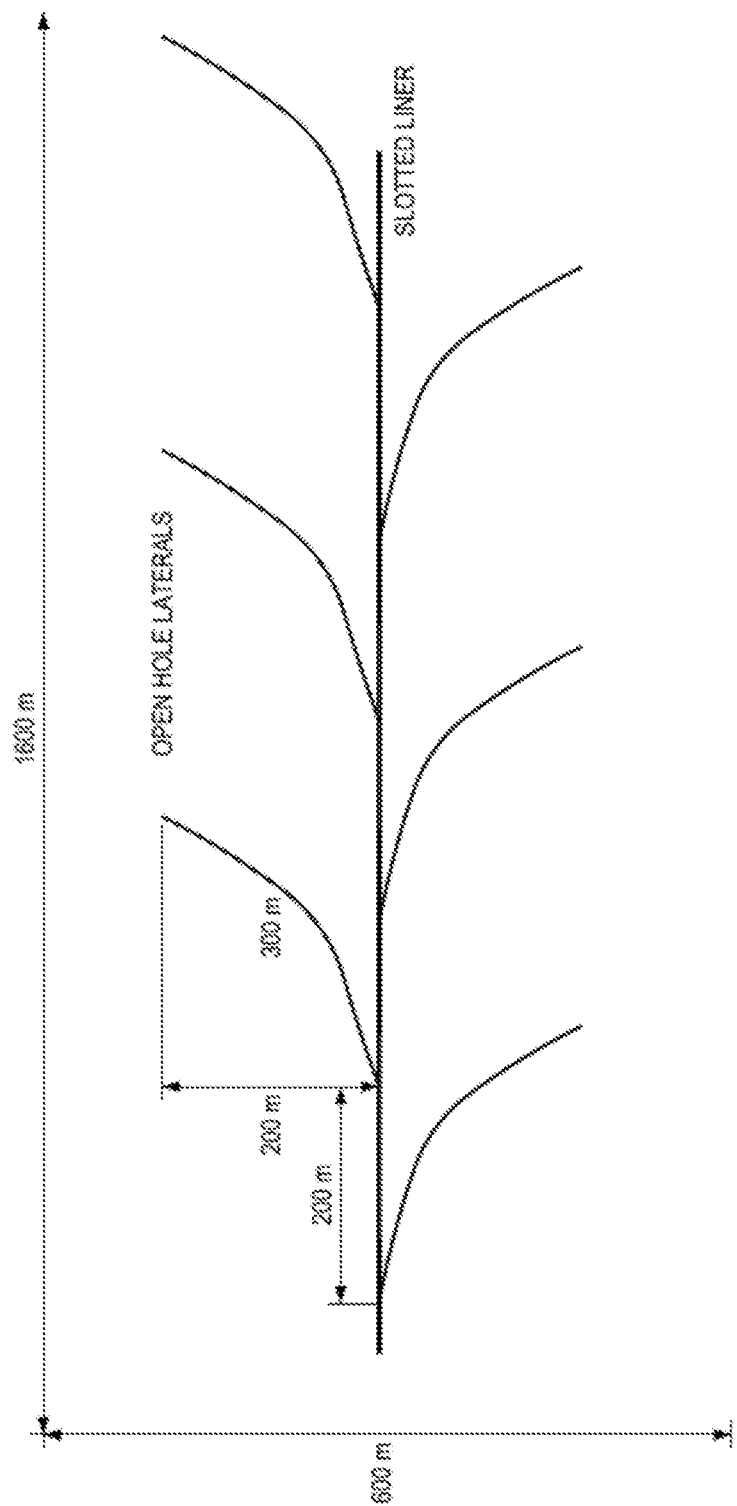
FIG. 3 displays the original "fishbone" well configuration concept with a 1200 m horizontal slotted liner (black) with associated open-hole "ribs" (red) draining a 600×1600 m region. This was a cold production method.
Figure 4:
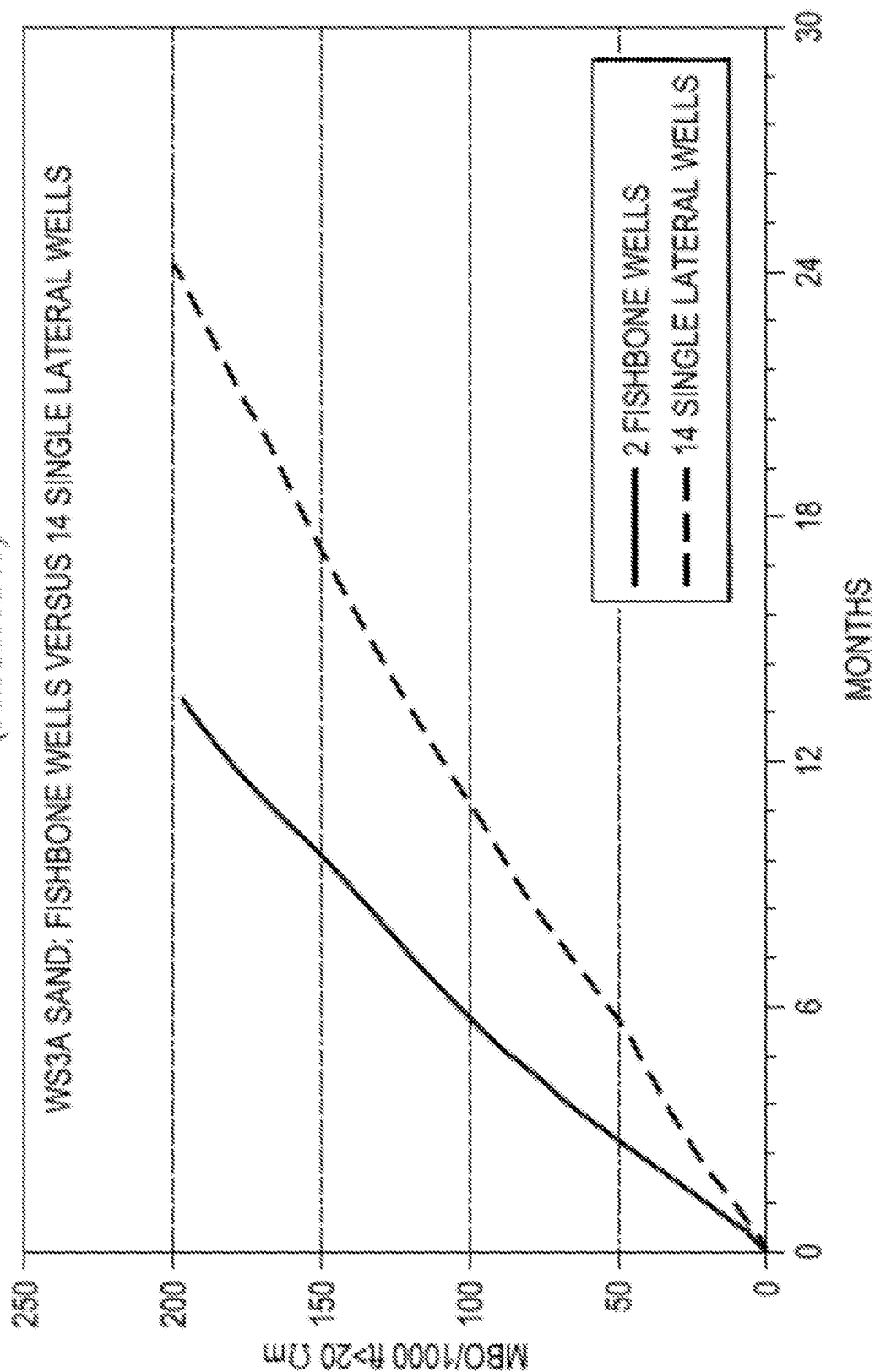
FIG. 4 shows the cold fishbone wells' higher rate per 1000 feet of net pay measured along the spine, and demonstrates that ribs boost productivity over single laterals.
Figure 5:
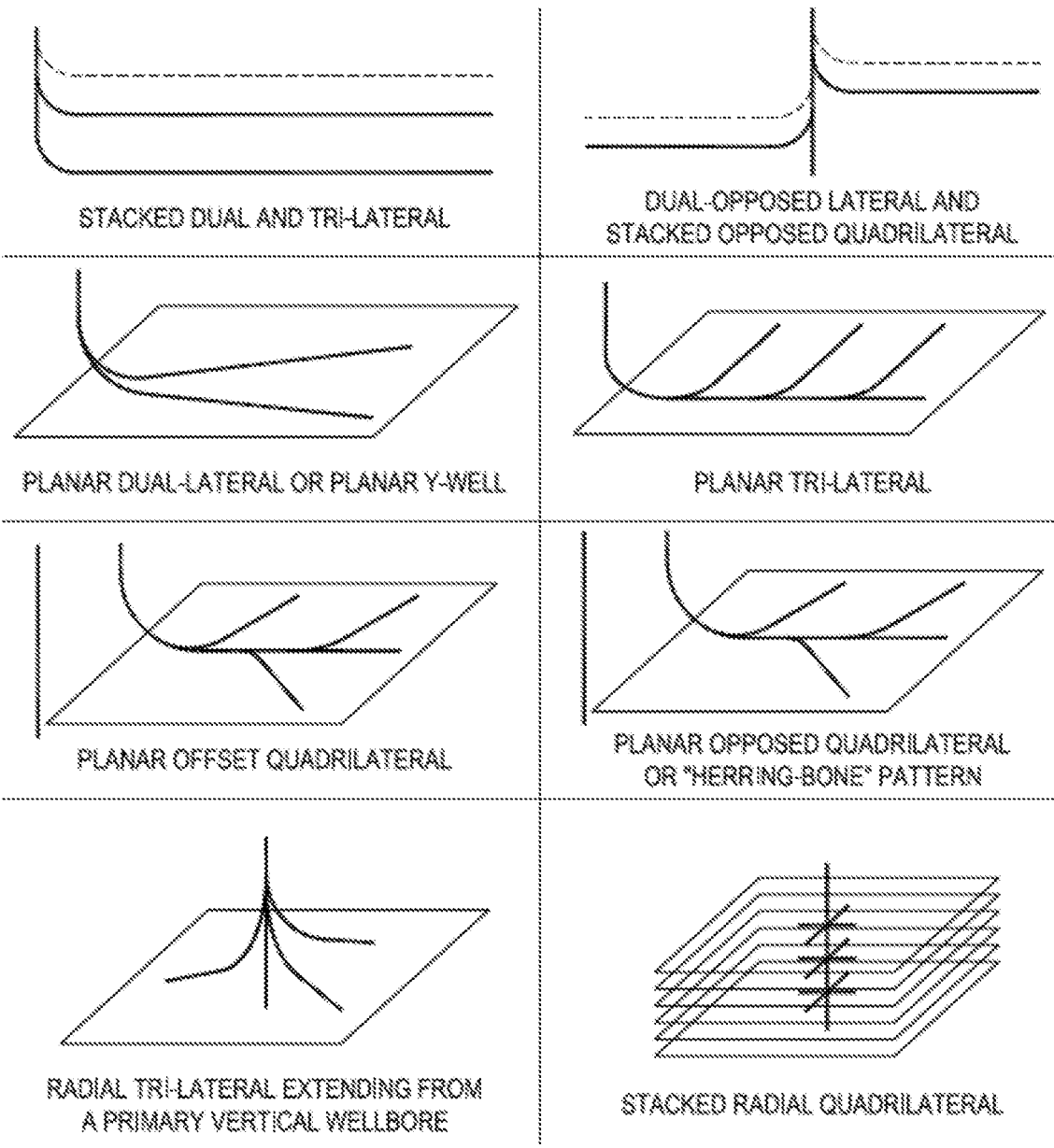
FIG. 5 shows a variety of multilateral well configurations, but additional variations are also possible.

The following is a detailed description of the preferred method of the present invention. It should be understood that the inventive features and concepts may be manifested in other arrangements and that the scope of the invention is not limited to the embodiments described or illustrated. The scope of the invention is intended to only be limited by the scope of the claims that are appended hereto.

The present invention provides a novel well configuration for electrically heated production of heavy oils using a thermally conductive proppant for heat conduction and lateral wells for play coverage.

Methods and well configurations are proposed to drill open-hole fishbone or multilateral well bores and use downhole electrical heating in the main wellbores to produce oil from bitumen, oil sands or other heavy oil reservoirs. The fishbone or multilateral wells are filled with thermally conductive material, such as bauxite particles, so that the heat provided from downhole electrical heaters conduct heat faster and provide heat to a larger area of the pay. The filler materials also stop the open-hole ribs from collapsing.

Two (or more) horizontal well-pairs are drilled five meters or more vertically apart from each other, e.g., vertically stacked as in traditional SAGD, or the well-pairs can be laterally spaced, as in fishbone SAGD. Open-hole multilateral well bores are drilled from the top well, the bottom well, or both, and these fishbones or ribs are filled with conductive material such as bauxite. Downhole electrical heaters will be placed in both main wellbore types—the upper wells and lower producers. The heaters can also travel someway down the lateral ribs, but generally the motherbores are heated. When the electrical heating provided to the reservoir through conduction reduces the oil viscosity, the oil will be drained to the producer.

Although particularly beneficial in gravity drainage techniques, this is not essential and the configuration could be used for horizontal sweeps as well. Thus, the methods and configurations can also be applied to single producers (rather than well-pairs) where fishbones are drilled off producer wells, filled with conductive material and heat is supplied to the reservoir through downhole heating. Drilling fishbones increase the surface area for heat conduction and oil drainage and filling the fishbones with thermally conductive material such as bauxite (used in proppants) increases the rate of heat conduction through the well. Further, if the laterals curve up, some degree of gravity drive will still be present.

The various well configurations can also be used in any enhanced oil recovery techniques, including cyclic steam stimulations, SAGD, expanding solvent SAGD, polymer sweeps, water sweeps, in situ combustion, solvent assisted methods, and the like. However, its real benefit lies in the avoidance of steam based techniques in the Artic tundra, and thus avoiding the potential for melting.

The ribs can be placed in any arrangement known in the art, depending on reservoir characteristics and the positioning of nonporous rocks and the play. Ribs can originate from producers or upper wells or both, but may preferably originate from the producers. Usually, the ribs are open-hole ribs, but the addition of thermally conductive proppant stabilizes the hole and prevents collapse, even when heated.

The ribs can be planar or slanted or both, e.g., preferably slanting upwards towards the upper wells, where upper wells are placed higher in the pay. However, upper wells are not essential with this method. Indeed, upwardly slanted wells can take the place of upper wells, and can be desirable to contact more of a thick pay, or where thin stacked pay zones exist. Downwardly slanting wells or undulating wells may also be used in some cases. Combinations are also possible.

The rib arrangement on a particular main well can be pinnate, alternate, radial, or combinations thereof. The ribs can also have further ribs, if desired, although this may be complicated to drill.

Figure 6A:
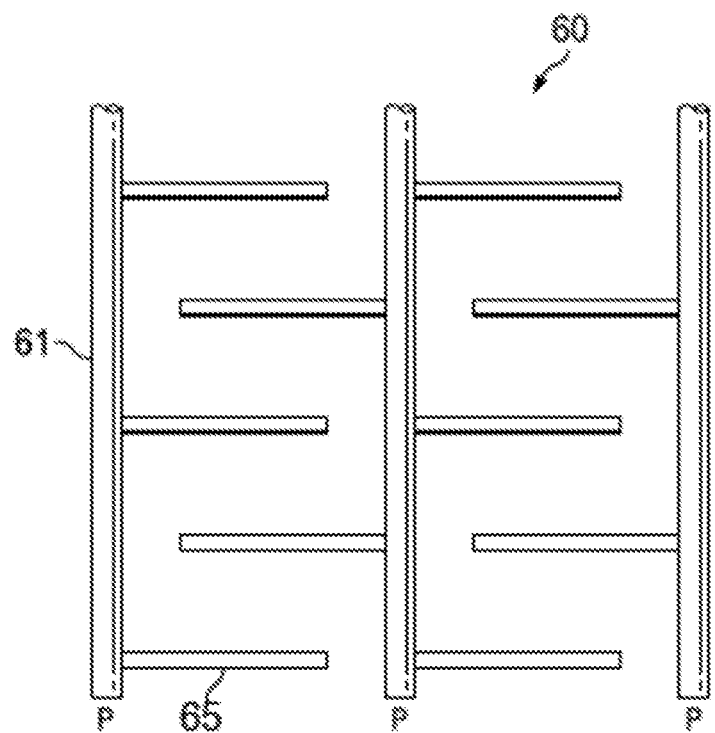
FIG. 6A-B shows top (A) and side (B) views of a well arrangement wherein there are only producer wells and the laterals curve upwards.
Figure 6B:
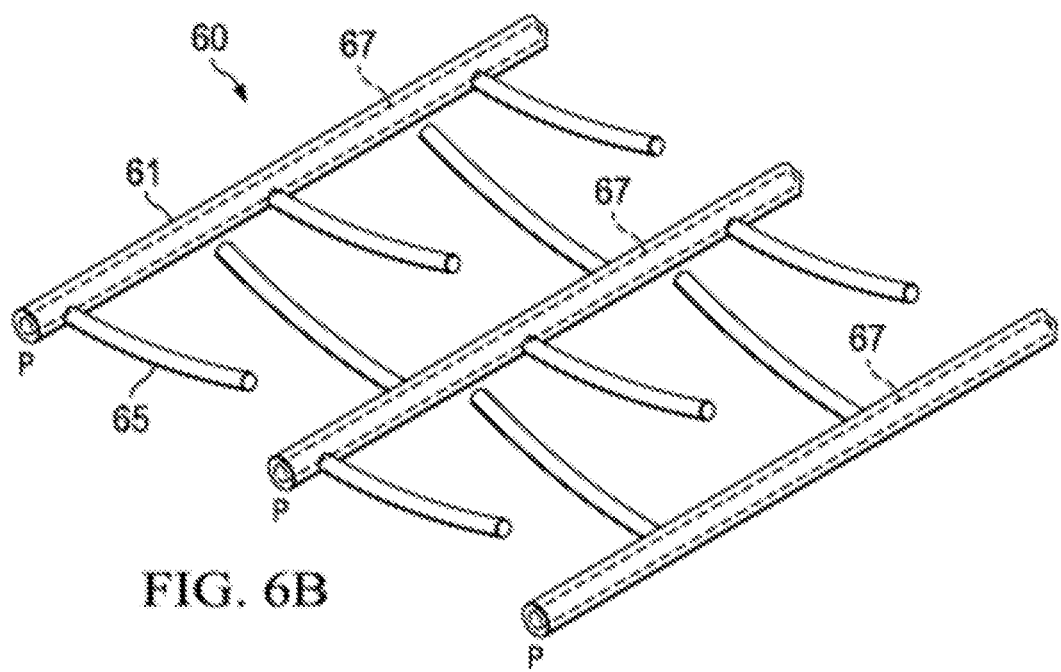

FIG. 6 shows one embodiment of the invention 60 wherein only producer wells 61 are drilled. However, the lateral wells 65 drilled off of the producers curve upwardly in the play, allowing some degree of gravity drainage.

Heaters 67 are placed inside the producer wells 61, outside of the production tubing (not shown).

Figure 7A:
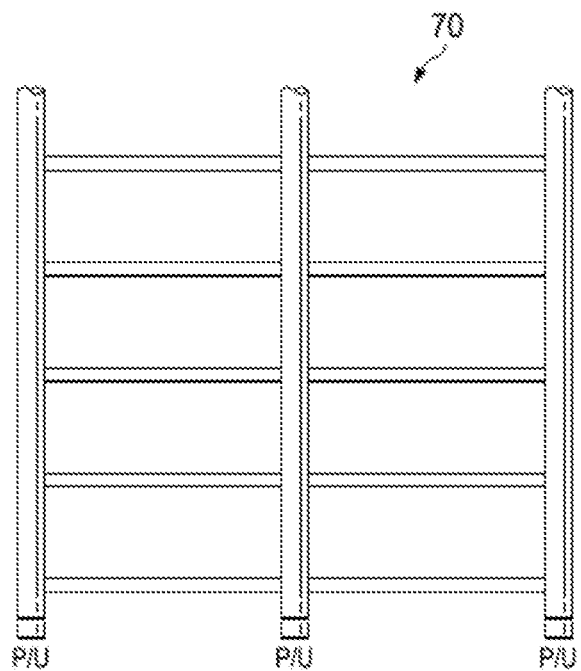
FIG. 7A-B shows top (A) and side (B) views of vertically stacked well-pairs where the laterals reach all the way to the next adjacent well.
Figure 7B:
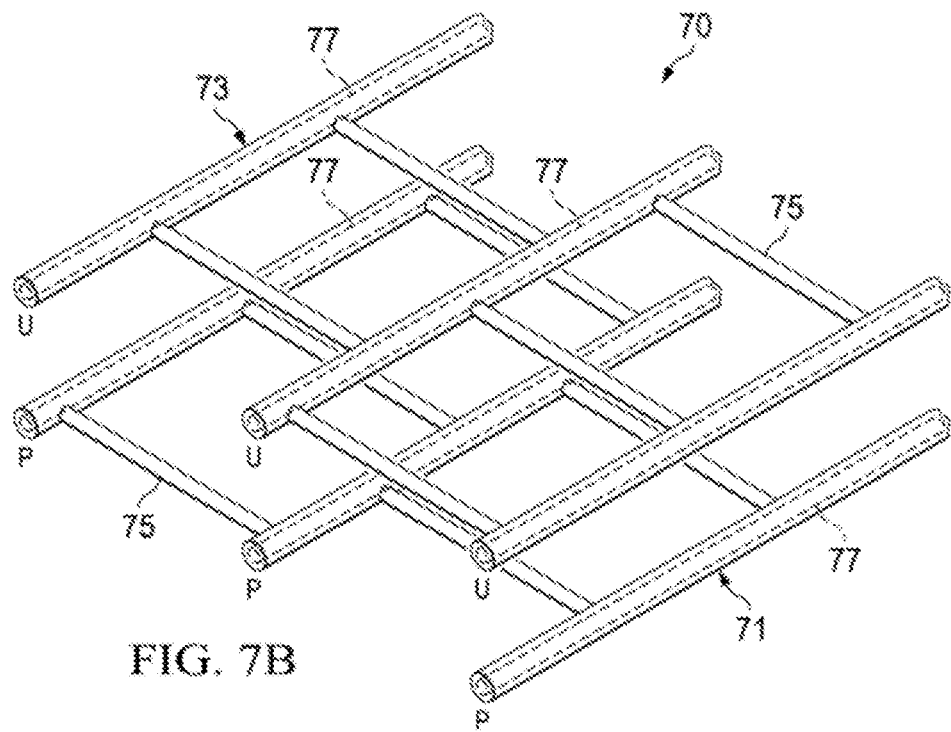

FIG. 7 shows another embodiment of the invention 70 wherein producer wells 71 are paired with upper wells 73 in the traditional SAGD style of well-pairs. Both well types have laterals 75 herein (an alternate pattern shown), and the producers and uppers are equipped with inline heater 77. Here the laterals reach all the way to the adjacent well (100% coverage of the distance D between well-pairs.

Figure 8A:
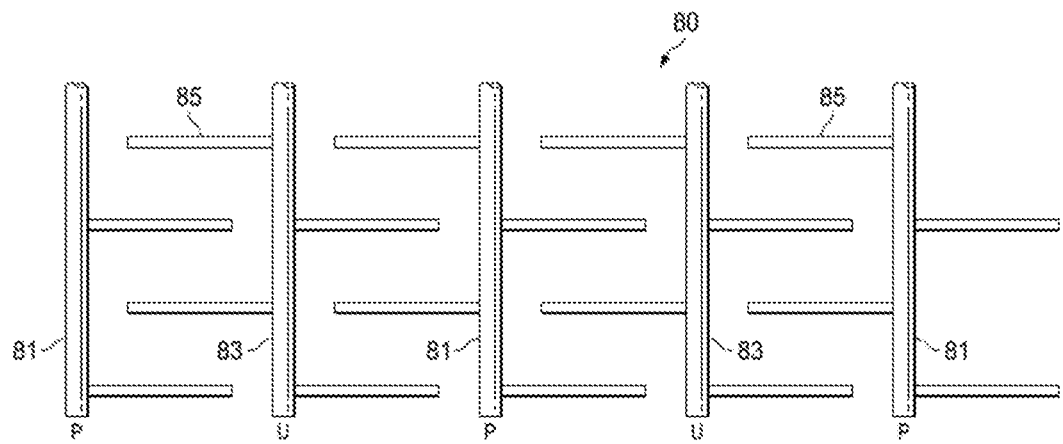
FIG. 8A-B shows top (A) and side (B) views well-pairs that are laterally spaced, wherein the lower production laterals curve upwards towards adjacent upper wells.
Figure 8B:
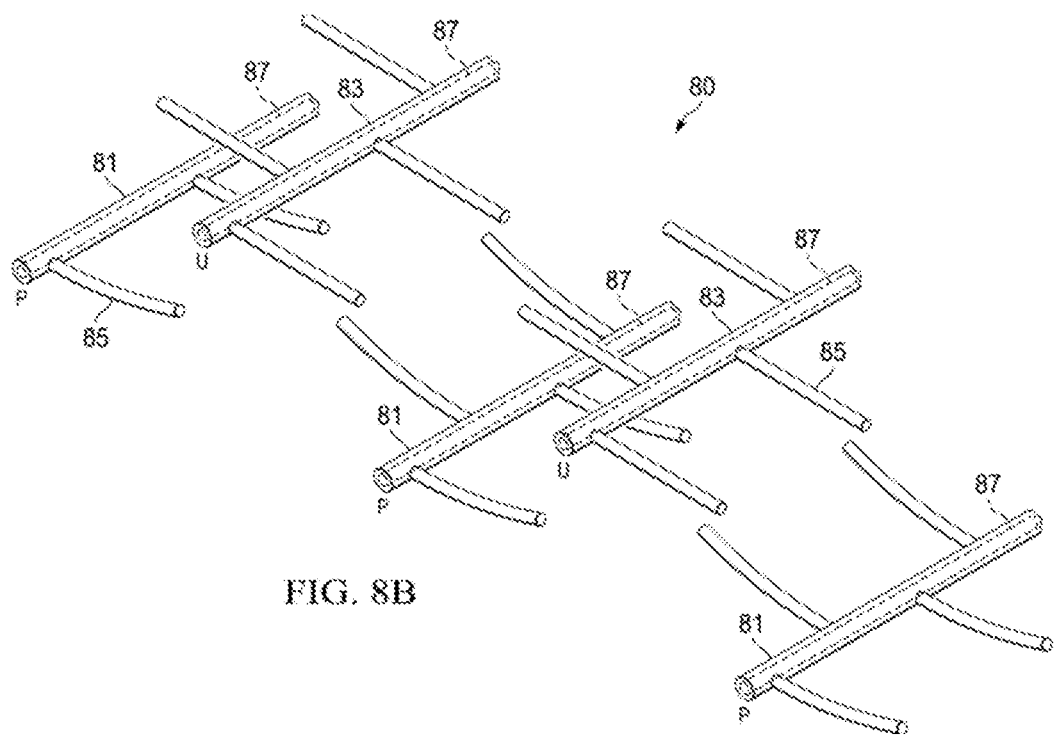

FIG. 8 shows yet another variation 80 wherein producer wells 81 are laterally spaced from upper wells 83. Both well types have laterals 85 herein (a pinnate pattern shown) and the producers and uppers are equipped with inline electric heaters 87. Herein the producer well laterals curve upwards towards upper wells, but they could be largely straight or undulate, and the upper laterals could also vary.

This lateral spacing of well-pairs may be particularly beneficial, as fewer wells are drilled in this lateral spacing well-pair configuration. This means that the wellhead plumbing, manifolding, control valves and other well pad facilities can be reduced. Also, because the total number of wells drilled can be reduced, the cost of production can be brought down significantly. Because of the simple yet effective well configuration, the drilling trajectories can be simplified, thus enabling drilling longer well length. Also because of the extensive coverage of the formation between main wellbores, the "wedge" oil that is often stranded between conventional SAGD well-pairs can now be more easily and quickly developed without drilling additional infill wells, which further lower the production cost.

Figure 9:
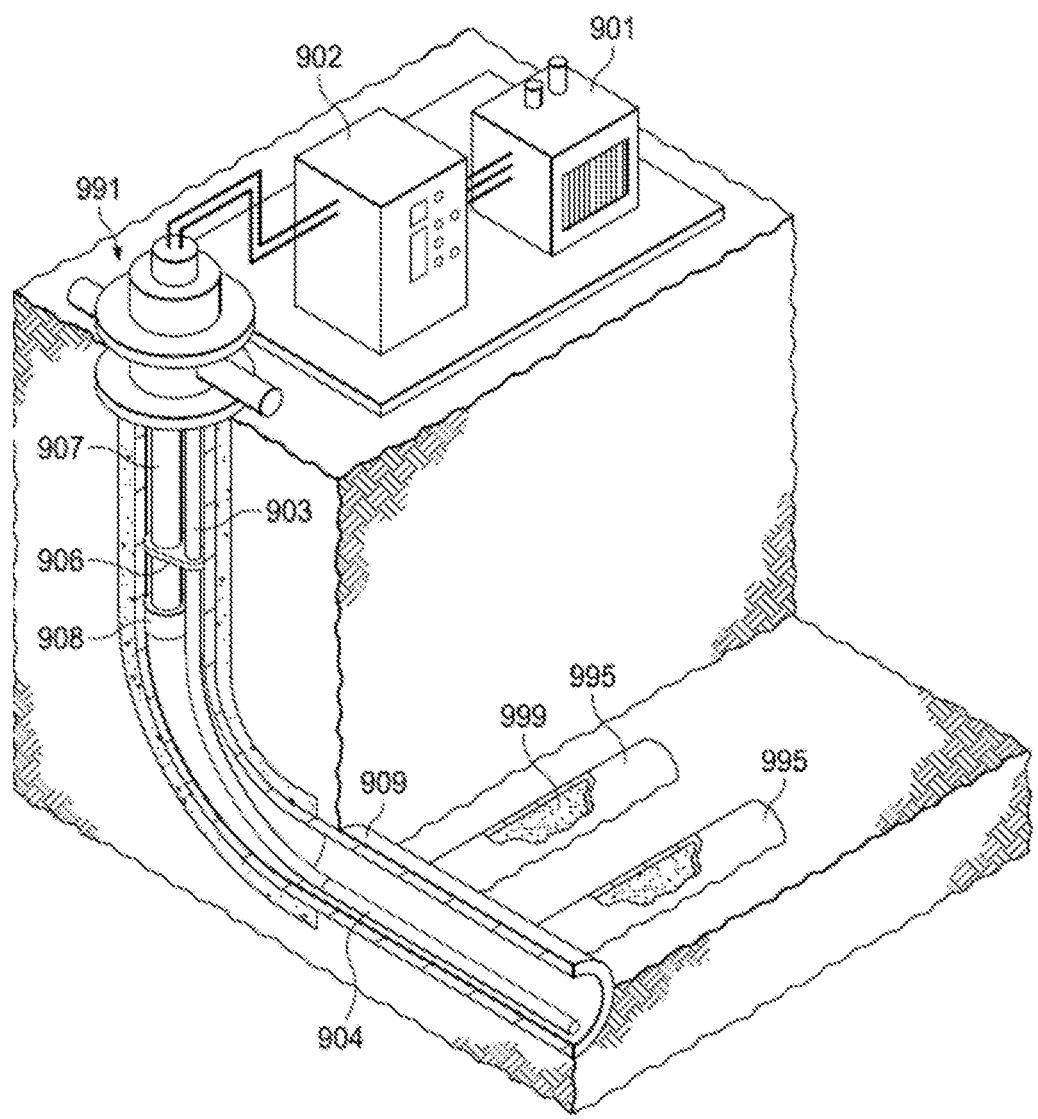
FIG. 9. shows side view of horizontal well with laterals, proppant and downhole heater.

FIG. 9 shows some additional detail of the heater in the wellbore. This figure is simplified to show a single producer well 991 and two laterals 995 filled with proppant 999. Also shown are 901 power supply transformer, which can be on the pad or nearby or remote, intermediate frequency supply 902, which regulates the amount of heat, up or down you put into the heater (Watts/ft), the special heating cable 903 inside the production tubing 909 with a zone of cable 904 that allows localized heating. A special clip 906 hangs the heating cable. Also seen is a sucker rod 907 and sucker pump 908, but other equipment could be used.

We have simulated heater, fishbone and proppant use in modeling studies. FIG. 10 shows our model parameters, wherein a main motherbore or spine is outfitted with an electric heater at 100W/ft and two fishbones are simulated, both with and without proppant (in this case bauxite particles were simulated).

FIG. 11 shows oil recovery using this simulation, and recovery is greatly improved with the use of fishbones, and there is again a small improvement by including the proppant fill in the fishbones. It is important to note that fishbone number, spacing and placement was not optimized in this model, and that further improvements are still possible. Furthermore, we only modeled heaters in the horizontal portion of the spine, but heaters could also travel down the fishbones if desired and technically feasible, which are expected to greatly amplify the proppant effect.

Figure 12A:
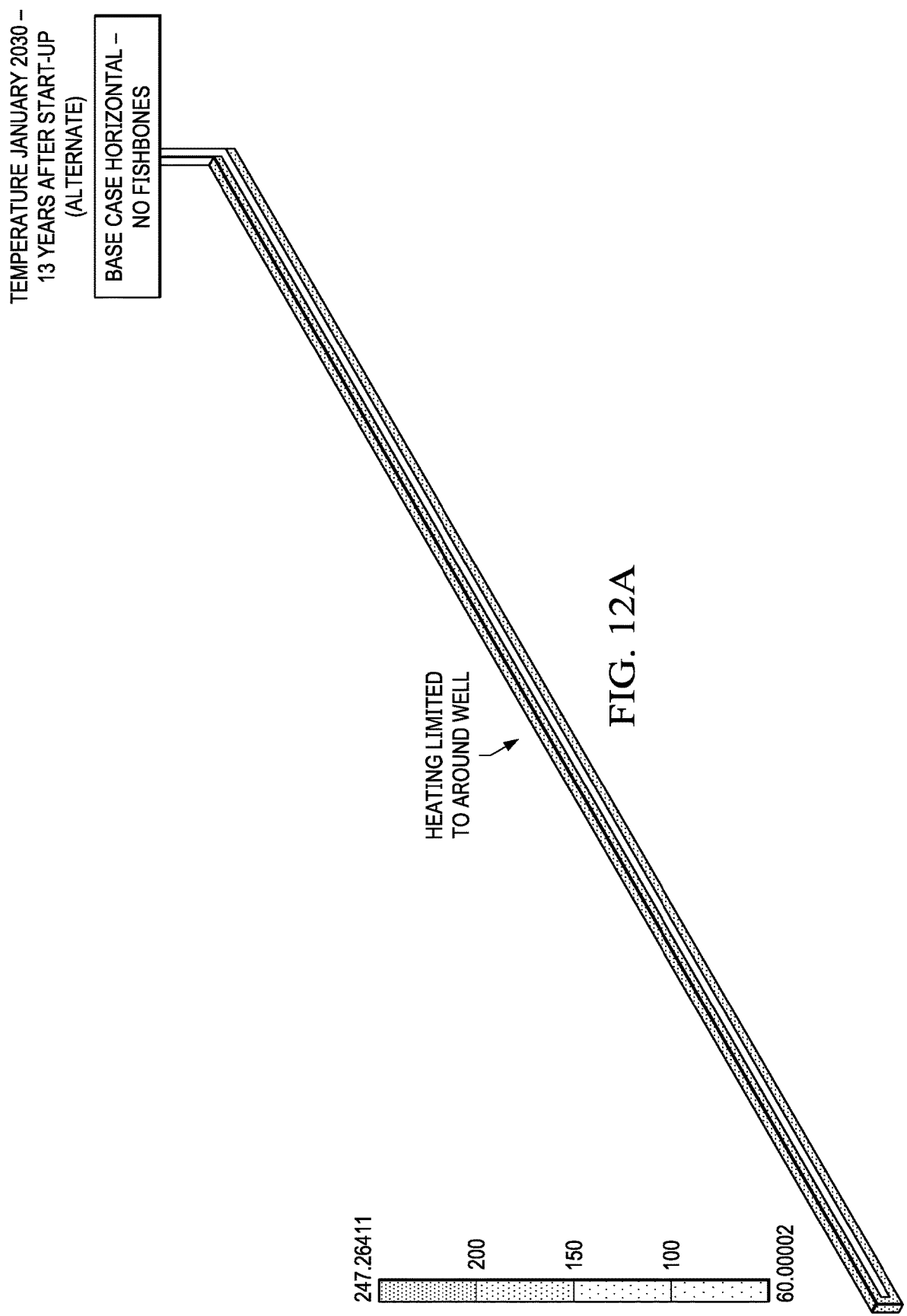
FIG. 12A-B shows the simulated reservoir heating results, and a much wider area of the reservoir is heated using a horizontal with proppant filled open-hole fishbones, than with empty fishbones, or no laterals at all. Additional heating of the reservoir away from the spine reduces the viscosity, hence reduces the pressure drop and increases the effective wellbore radius improving productivity.
Figure 12B:
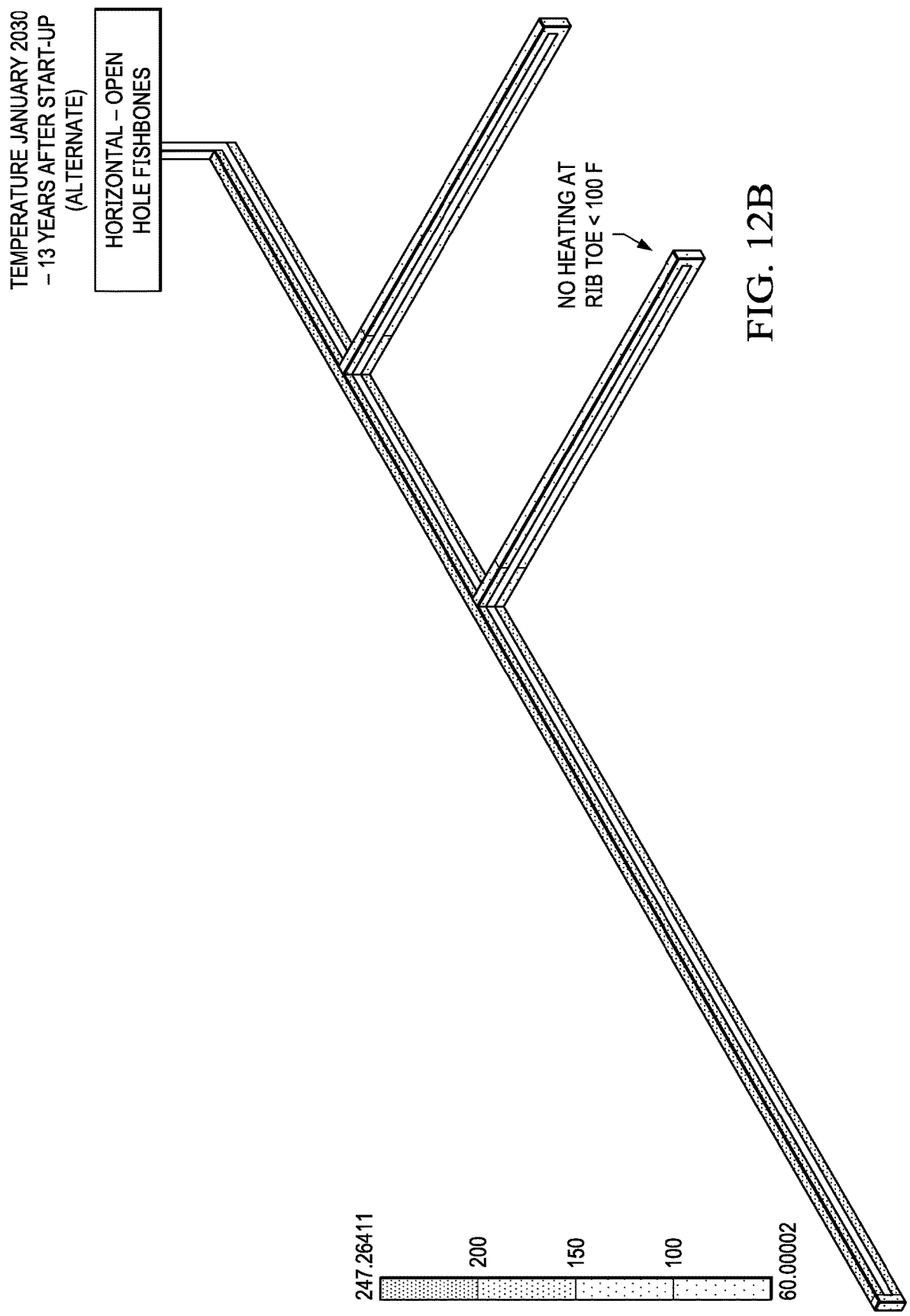
Figure 12C:
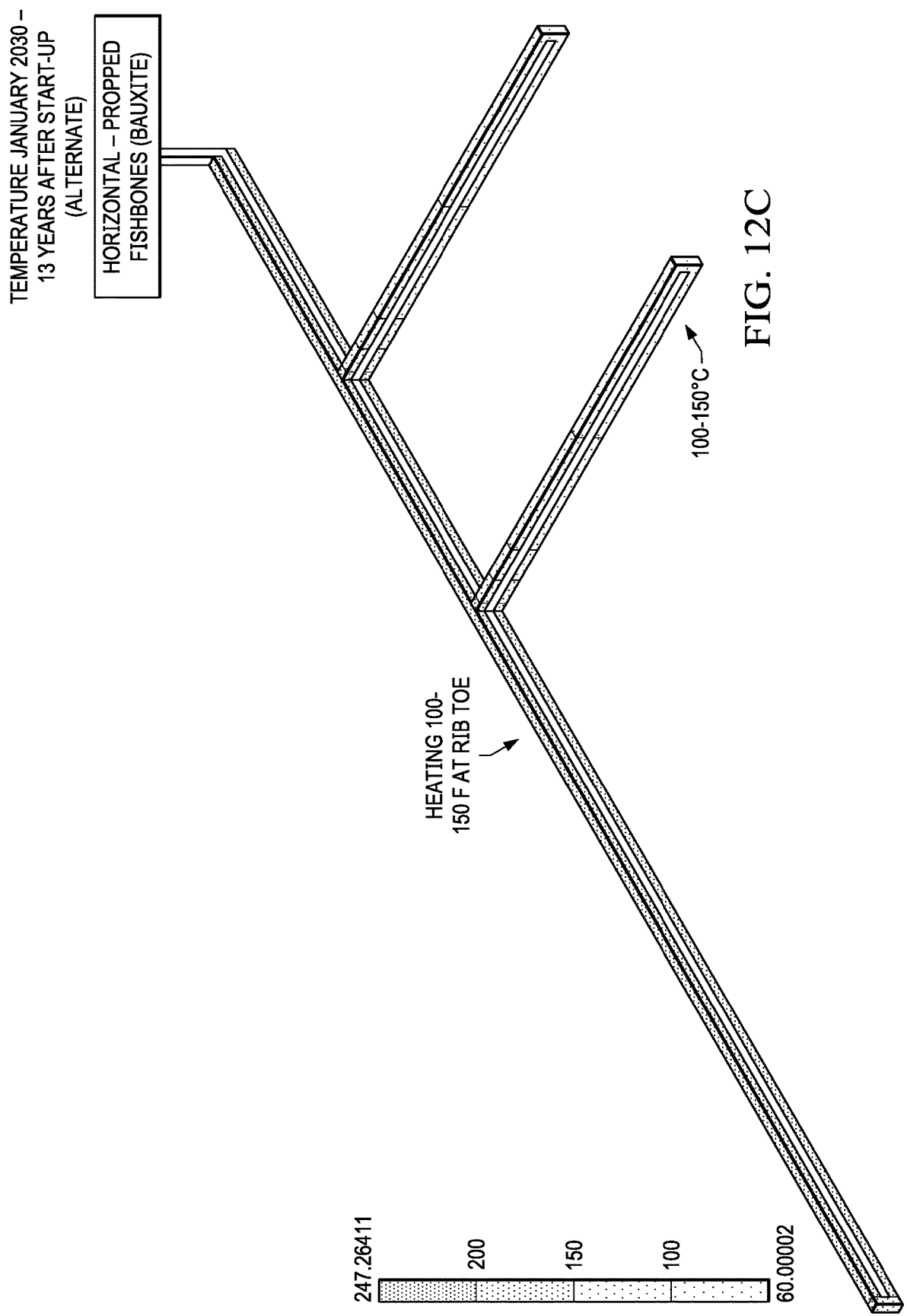

FIG. 12A-C shows the zone of heating around the motherbore (spine) and we can see that a wider zone is heated using the electric inline heater and fishbones, as opposed to the same setup without fishbones or with empty fishbones (no proppant).

The advantages of electrical stimulation of wells and reservoirs are several:

The production is not interrupted by the application of electrical power.

It seems more efficient energetically than steam stimulation (although more careful determinations of the energy gain factors should be obtained from fully instrumented field tests).

It can be used in shallow wells where steam breakthrough can occur.

It avoids heating near the surface.

Electrical heating does not require the additional investments required for a steam distribution system because most wells with pumps already have electrical grid connections. In most cases, the level of electrical power available at the well sites is sufficient to accommodate a higher power requirement.

The widespread application of electrical submersible pumps (operating at high voltages) has generalized the knowledge required for electrical cable installations in oil installations, making it a routine process.

The following references are incorporated by reference in their entirety for all purposes.

STALDER J. L., et al., Alternative Well Configurations in SAGD: Rearranging Wells to Improve Performance, presented at 2012 World Heavy Oil Congress [WHOC12], available online at http://www.osli.ca/uploads/files/Resources/Alternative%20Well%20Configurations%20in%20SAGD_WHOC2012.pdf OTC 16244, Lougheide, et al. Trinidad's First Multilateral Well Successfully Integrates Horizontal Openhole Gravel Packs, OTC (2004).

SPE 69700-MS, "Multilateral-Horizontal Wells Increase Rate and Lower Cost Per Barrel in the Zuata Field, Faj a, Venezuela", Mar. 12, 2001.

Technical Advancements of Multilaterals (TAML). 2008. Available at http://taml-intl.org/taml-background/ http://petrowiki.org/Multiateral_completions

EME 580 Final Report: Husain, et al., Economic Comparison of Multi-Lateral Drilling over Horizontal Drilling for Marcellus Shale Field (2011), available online at http://www.ems.psu.edu/~elsworth/courses/egee580/2011/Final%20Reports/fishbone_report.pdf Hogg, C. 1997. Comparison of Multilateral Completion Scenarios and Their Application. Presented at the Offshore Europe, Aberdeen, United Kingdom, 9-12 September. SPE-38493-MS.

U.S. Pat. Nos. 8,333,245 8,376,052 Accelerated production of gas from a subterranean zone US20120247760 Dual Injection Points In SAGD US20110067858 Fishbone Well Configuration For In Situ Combustion US20120227966 In Situ Catalytic Upgrading

US20140345861 FISHBONE SAGD

CA2684049 INFILL WELL METHODS FOR SAGD WELL HEAVY

HYDROCARBON RECOVERY OPERATIONS

US20140345855 RADIAL FISHBONE SAGD

U.S. Pat. No. 7,069,993 Down hole oil and gas well heating system and method for down hole heating of oil and gas wells U.S. Pat. No. 6,353,706 Optimum oil-well casing heating U.S. Pat. No. 8,265,468 Inline downhole heater and methods of use

What is claimed is:

1. A method of producing heavy oil, comprising:
    a) providing a plurality of wellpairs in a heavy oil reservoir laterally separated by a distance D;
    b) each wellpair comprising:

i) a horizontal production well configured for heating with an electric downhole heater at a first depth at a bottom of a play, ii) a horizontal upper well at a second depth above said first depth and parallel to said production well;

iii) a plurality of open-hole lateral wells at said second depth extending from said upper well or at said first depth extending from said production well, or both, iv) each of said lateral wells filled with thermally conductive particles; and v) said plurality of lateral wells extending towards a nearest wellpair and covering at least 95% of D;

c) applying electricity to said heater, thereby heating said thermally conductive particles and mobilizing heavy oil; and d) producing said mobilized heavy oil at said production well in each wellpair.

2. The method of claim 1, wherein each said upper well is configured for heating with an electric downhole heater.

3. The method of claim 1, wherein said upper well in a wellpair is at least 25 meters laterally spaced from said production well in said wellpair.

4. The method of claim 1, wherein said distance D is at least 50 meters.

5. The method of claim 1, wherein said thermally conductive particles have a thermal conductivity of at least 20 watts per meter kelvin ($Wm^{-1}K^{-1}$).

6. The method of claim 1, wherein said thermally conductive particles are bauxite.

7. The method of claim 1, wherein said plurality of lateral wells originate from each said production well and each said upper well.

8. The method of claim 1, wherein said plurality of lateral wells originate from each said production well, and intersect with an adjacent upper well or an open-hole lateral extending from said adjacent upper well.

9. The method of claim 1, wherein said plurality of lateral wells originate from each said production well and slant upwards towards an adjacent upper well.

10. The method of claim 1, wherein said plurality of lateral wells are arranged in an alternating pattern.

11. The method of claim 1, wherein said plurality of lateral wells originate from each said production well and each said upper well and are arranged in an alternating pattern such that ends of said lateral wells from adjacent wells overlap, such that together a pair of lateral wells cover about 100% of said distance D.

12. A method of production of hydrocarbons, said method comprising:

a) providing a well configuration in a hydrocarbon reservoir comprising:

i) a plurality of horizontal producer wells configured for heating with an electric downhole heater and laterally separated from an adjacent producer well by a distance D;

ii) each producer well at a first depth at the bottom of a hydrocarbon play;

iii) a plurality of open-hole lateral wells originating at said first depth from said plurality of producer wells and covering at least 95% or said distance D and said plurality of open-hole lateral wells filled with thermally conductive particles;

b) applying electricity to heat said heater(s);

c) heating said thermally conductive particles and thereby producing mobilized hydrocarbons; and d) producing said mobilized hydrocarbons from said producer wells.

13. The method of claim 12, wherein said distance D is at least 50 meters.

14. The method of claim 12, wherein said thermally conductive particles have a thermal conductivity of at least 20 watts per meter kelvin ($Wm^{-1}K^{-1}$).

15. The method of claim 12, wherein said thermally conductive particles are bauxite.

16. The method of claim 12, further comprising a plurality of upper wells, each upper well at least 25 meters laterally spaced from an adjacent production well and above said production well.

* * * * *